(12) United States Patent
Beaver (10) Patent No.: US 11,289,884 B2
(45) Date of Patent: Mar. 29, 2022

(54) ISOLATING BUS ENCLOSURE ARRANGEMENTS FOR SWITCHGEAR

(71) Applicant: Eaton Intelligent Power Limited, Dublin (IE)

(72) Inventor: Jon Christopher Beaver, Asheville, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/009,447

(22) Filed: Jun. 15, 2018

(65) Prior Publication Data

US 2018/0366919 A1    Dec. 20, 2018

Related U.S. Application Data

(60) Provisional application No. 62/520,837, filed on Jun. 16, 2017.

(51) Int. Cl.
| H02B 1/20 | (2006.01) |
| H02G 5/06 | (2006.01) |
| H02G 5/04 | (2006.01) |
| H02B 13/035 | (2006.01) |
| H02B 13/00 | (2006.01) |

(52) U.S. Cl.
CPC ............ *H02B 1/20* (2013.01); *H02B 13/035* (2013.01); *H02G 5/04* (2013.01); *H02G 5/06* (2013.01); *H02B 13/005* (2013.01)

(58) Field of Classification Search
CPC .......... H02B 1/20; H02B 13/005; H02G 5/04; H02G 5/06

USPC .......................................................... 361/614
See application file for complete search history.

(56) References Cited

U.S. PATENT DOCUMENTS

| 4,146,915 | A |   | 3/1979 | Yosida |   |
| 4,354,220 | A | * | 10/1982 | Oishi | ................ H02B 13/0352 200/301 |
| 5,003,427 | A | * | 3/1991 | Reichl | ..................... H02B 1/22 361/612 |
| 5,045,968 | A | * | 9/1991 | Suzuyama | ............... H02B 5/06 361/604 |
| 5,521,567 | A |   | 5/1996 | Devonald, III et al. |   |

(Continued)

FOREIGN PATENT DOCUMENTS

| CN | 201 708 405 U | 1/2011 |
| DE | 195 18 126 A1 | 11/1996 |

(Continued)

OTHER PUBLICATIONS

DE 102007063478 A1—English translation (Year: 2009).*

(Continued)

*Primary Examiner* — Anatoly Vortman
(74) *Attorney, Agent, or Firm* — Stanek Lemon Crouse & Meeks, P.A.

(57) ABSTRACT

A switchgear assembly includes a plurality of gas insulated switches arranged in at least one row and a plurality of enclosures arranged in at least one row forming at least one channel extending parallel to the at least one row of switches. The switchgear assembly further includes at least one bus assembly disposed in the at least one channel and including a plurality of interconnected bus sections having an insulating covering and electrically connected to the gas insulated switches.

11 Claims, 6 Drawing Sheets

(56) References Cited

U.S. PATENT DOCUMENTS

| | | | |
|---|---|---|---|
| 6,362,445 | B1 | 3/2002 | Marchand et al. |
| 6,433,271 | B1 * | 8/2002 | Arnborg .............. H02B 13/005 174/16.2 |
| 6,518,531 | B2 | 2/2003 | Arioka |
| 7,417,846 | B2 | 8/2008 | Arioka |
| 7,450,368 | B2 | 11/2008 | Parker |
| 8,045,322 | B2 | 10/2011 | Kurogi |
| 8,717,742 | B2 | 5/2014 | Kim |
| 8,791,379 | B2 | 7/2014 | Kikukawa |
| 8,916,059 | B2 | 12/2014 | Glasmacher |
| 9,620,937 | B1 * | 4/2017 | Johnson ................. H02B 1/565 |
| 9,906,008 | B2 | 2/2018 | Yoshida |
| 2001/0006856 | A1 | 7/2001 | Starck |
| 2009/0020507 | A1 | 1/2009 | Kurogi |
| 2013/0050905 | A1 | 2/2013 | Kim |
| 2018/0366924 | A1 | 12/2018 | Yanniello |
| 2018/0366925 | A1 * | 12/2018 | Beaver .............. H02B 13/0358 |

FOREIGN PATENT DOCUMENTS

| | | | |
|---|---|---|---|
| DE | 102 19 299 B3 | 2/2004 | |
| DE | 102007045486 | 5/2008 | |
| DE | 102007063478 | 2/2009 | |
| EP | 0199891 A2 | 11/1986 | |
| EP | 0563535 | 10/1993 | |
| EP | 1107408 A1 * | 6/2001 | .......... H02B 13/035 |
| FR | 1362997 | 6/1964 | |
| JP | 0476108 U | 7/1992 | |
| JP | 05304704 | 11/1993 | |
| JP | 10191514 | 7/1998 | |
| WO | WO 91/00633 | 1/1991 | |
| WO | WO 96/18225 | 6/1996 | |
| WO | WO 01/50563 | 7/2001 | |
| WO | WO 03/081738 A1 | 10/2003 | |
| WO | WO 2013021678 | 2/2013 | |
| WO | WO 2016/092659 | 6/2016 | |

OTHER PUBLICATIONS

WO 96/18225—English translation (Year: 1996).*
DE 102007045486—English translation (Year: 2008).*
Notification of Transmittal of the International Search Report and the Written Opinion of the International Searching Authority or the Declaration; PCT/US2018/037762; dated Aug. 28, 2018; 12 pages.
"Cubicle Type Gas Insulated Switchgear : HMGS," Hyundai Heavy Industries Co., Ltd., 2 pages, Downloaded from the Internet at: www.hyundai-elec.com, Jul. 6, 2017.
"GV3 (Single Bus) and GV3D (Double Bus) Gas Insulated Switchgear," TAMCO Switchgear (Malaysia) SDN BHD, Publication 1 GV3/GB3D—Ed 2011, 2 pages.
"Medium voltage switchgear for Substation Solutions, cpg.0 y cpg.1, Families of single and double busbar GIS-type cubicles, up to 40.5 kV," Ormazabal velatia, Downloaded from the Internet at: www.ormazabal.com, Jul. 6, 2017.
"MV Switchgear for Substation Solutions, CPG.0 & CPG.1, Single and double busbar panel type GIS system," Ormazabal velatia, Downloaded from the Internet at: www.ormazabal.com, Jul. 6, 2017.
"ZX2.2 Medium voltage gas-insulated switchgear," ABB, Inc., 1VAL 1001-DB Rev. C, May 2010, 20 pages.
"ZX2.2 Medium voltage switchgear, Increase safety and dependability," ABB, Inc., 1VAL 109901-FL Rev. C, Apr. 2010, 2 pages.
Aufermann et al., "New gas-insulated switchgear for all medium voltage applications," English translation of German publication in the journal "etz 18/2001 p. 20-22."
Fink et al., "New Gas Insulated Switchgear (GIS) for All Medium Voltage Applications," International Power Distribution Congress Cidel Argentina 2002, pp. 1-5.
Notification of Transmittal of the International Search Report and the Written Opinion of the International Searching Authority, or the Declaration, PCT/US2018/037746, dated Aug. 28, 2018, 12 pages.
DE 102007045486, Machine English Translation, Year: 2005.
International Preliminary Report on Patentability, PCT/US2018/037762; dated Dec. 26, 2019; 8 pages.
International Preliminary Report on Patentability, PCT/US2018/037746; dated Dec. 26, 2019; 9 pages.

* cited by examiner

ISOLATING BUS ENCLOSURE ARRANGEMENTS FOR SWITCHGEAR

CROSS-REFERENCE TO RELATED APPLICATIONS

The present application claims priority to U.S. Provisional Patent Application No. 62/520,837, filed Jun. 16, 2017, entitled ISOLATING BUS ENCLOSURE ARRANGEMENTS FOR SWITCHGEAR, the content of which is herein incorporated herein by reference in its entirety.

The inventive subject matter relates to electrical apparatus and, more particularly, to switchgear.

In typical gas-insulated switchgear (GIS), certain components that are prone to arc generation are placed in closed structures filled with an insulating high-dielectric gas, such as sulfur hexafluoride ($SF_6$). The insulation properties of the gas allow reduced spacing between components and thus enable relatively compact arrangement of the switchgear components. While high-voltage (e.g., 50 kV and above) switchgear is commonly gas-insulated, medium-voltage circuit breakers and other medium-voltage devices may also utilize gas insulated switching components to provide compact form factors for particular industrial and other applications.

SUMMARY

Some embodiments of the inventive subject matter provide a switchgear assembly including a plurality of gas insulated switches arranged in at least one row and a plurality of enclosures arranged in at least one row forming at least one channel extending parallel to the at least one row of switches. The switchgear assembly further includes at least one bus assembly disposed in the at least one channel and including a plurality of interconnected bus sections having an insulating covering and electrically connected to the gas insulated switches.

In some embodiments, the plurality of enclosures may include a first row of tubular enclosures forming a first channel and a second row of tubular enclosures forming a second channel parallel to the first channel. The at least one bus assembly may include a first bus assembly in the first channel and electrically connected to a first group of the gas insulated switches and a second bus assembly in the second channel and electrically connected to a second group of the gas insulated switches. The first and second bus assemblies may correspond to respective phases.

In some embodiments, walls of adjacent tubular enclosures of the first and second rows of tubular enclosures may be separated by an air gap. Walls of the tubular enclosures may be grounded or insulating.

In further embodiments, the at least one bus assembly may include interconnected bus sections, each including an inner conductor, an inner insulation layer surrounding the inner conductor, an outer shield conductor surrounding the inner insulation layer and the inner conductor, and an outer insulation layer surrounding the outer shield conductor, the inner insulation layer and the inner conductor.

In some embodiments, the plurality of enclosures may include a plurality of enclosures that each have first and second parallel compartments and that are arranged in a row to form parallel first and second channels. The at least one bus assembly may include a first bus assembly in the first channel and electrically connected to a first group of the gas insulated switches and a second bus assembly in the second channel and electrically connected to a second group of the gas insulated switches. Walls between the compartments in each of the enclosures may be insulating or grounded.

In some embodiments, the at least one bus assembly may be electrically connected to the gas insulated switches via connectors positioned at external faces of gas-containment enclosures of the gas insulated switches.

Further embodiments of the inventive subject matter may provide a switchgear assembly including a plurality of gas insulated switches and a bus containment structure including first and second bus channels separated by at least one wall and extending in parallel. The switchgear assembly further includes first bus assembly disposed in the first bus channel and including interconnected bus sections having an insulating covering and electrically connected to a first group of the gas insulated switches and a second bus assembly disposed in the second bus channel and including interconnected bus sections having an insulating covering and electrically connected to a second group of the gas insulated switches. The bus sections may include an inner conductor, an inner insulation layer surrounding the inner conductor, an outer shield conductor surrounding the inner insulation layer and the inner conductor, and an outer insulation layer surrounding the outer shield conductor, the inner insulation layer and the inner conductor.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As used herein and in keeping with terminology commonly used in the electrical switchgear industry, "gas-insulated" refers to insulation using a relatively high dielectric gas (e.g., a pure gas or gas mixture, which may be pressurized) that has a controlled composition or pressurized air that provides enhanced insulation with respect to, for example, air with an uncontrolled composition at atmospheric pressure. The insulation gas used in a gas-insulated switchgear component may include, for example, a high-dielectric halogenated gas, such as sulfur hexafluoride ($SF_6$) and/or alternatives thereto, such as fluorinated gas (e.g., fluoroketone-based) mixtures. It will be appreciated that the composition of such an insulation gas may be maintained, for example, by containment of the insulation gas within a sealed compartment and/or control of the gas composition using an active control system.

Medium voltage switchgear units typically include three-phase bus structures that interconnect multiple switchgear units. Some of the most devastating faults that can occur in such medium voltage switchgear arrangements are phase-to-phase faults, which can occur where bus sections for different phases run in relatively close proximity to one another, such as where buses extend to interconnect multiple units. Some embodiments of the inventive subject matter provide bus enclosure arrangements for switchgear in which insulated bus sections are disposed in bus enclosures that can provide enhance isolation between phases and reduce the likelihood of phase-to-phase faults.

Figure 1:
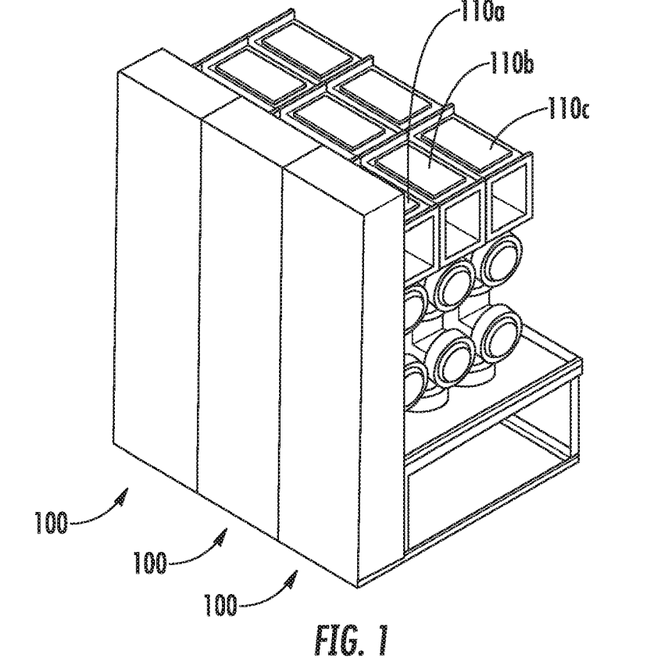
FIG. 1 is a perspective view of a switchgear arrangement according to some embodiments.
Figure 2:
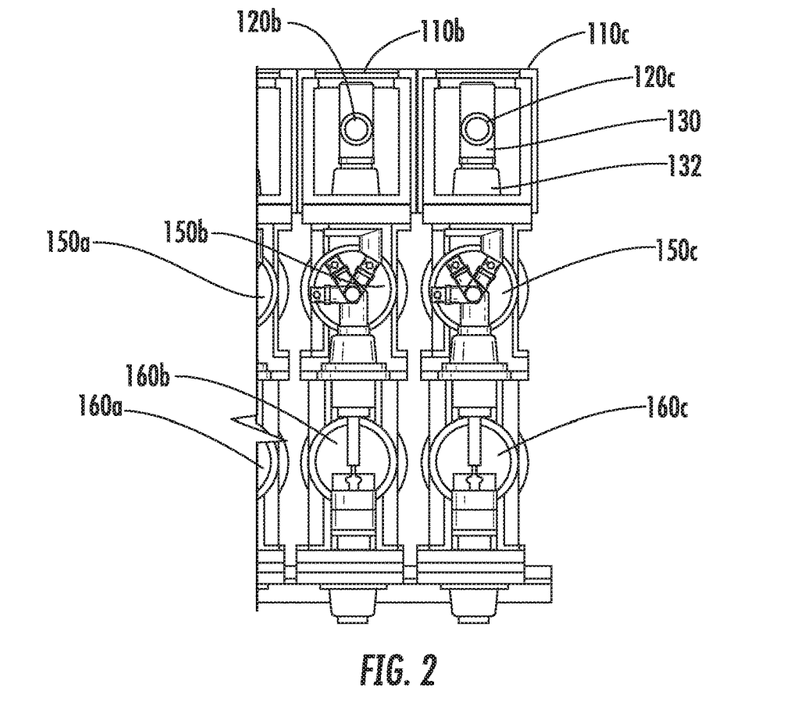
FIG. 2 is a rear elevation of the switchgear arrangement of FIG. 1.
Figure 3:
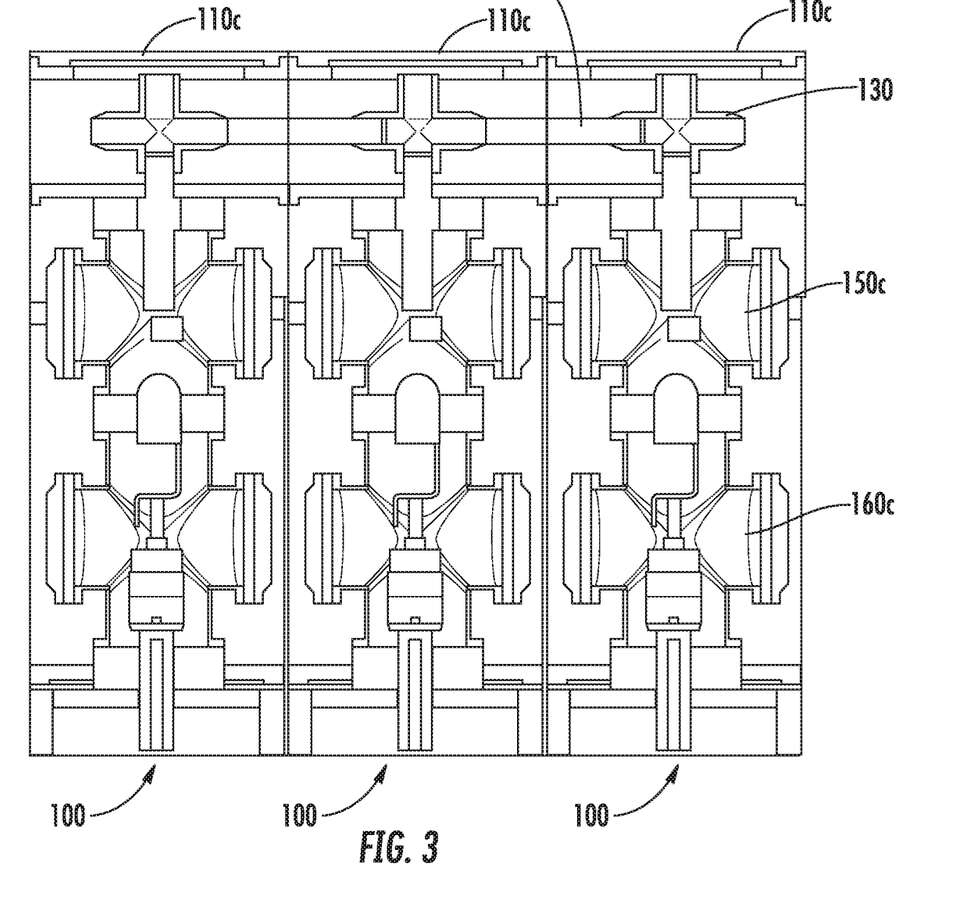
FIG. 3 is a perspective view of an insulated bus arrangement for the switchgear arrangement of FIG. 1.

FIGS. 1-3 illustrate a switchgear arrangement according to some embodiments. FIG. 1 is a perspective view illustrating three switchgear units (panels) 100 arranged in a row and interconnected by a bus assembly including bus sections that are disposed within enclosures 110a, 110b, 110c. FIG. 2 is a side elevation illustrating that respective bus sections 120a, 120b, 120c for respective phases are disposed within the respective bus enclosures 110a, 110b, 110c, thus providing isolation between the phases. As shown, the bus enclosures 110a, 110b, 110c may be cast metal structures, with air gaps provided between the grounded walls of adjacent ones of the bus enclosures 110a, 110b, 110c for the respective phases. The bus sections 120a, 120b, 120c may be interconnected by cross-type bus connectors 130, which may also connect the bus sections 120a, 120b, 120c to gas-insulated disconnect switches 150a, 150b, 150c via bushing-type connectors 132. The disconnect switches 150a, 150b, 150c may further be connected to respective gas-insulated circuit interrupters 160a, 160b, 160c. It will be appreciated, however, that the arrangement of disconnect switches 150a, 150b, 150c and circuit interrupters 160a, 160b, 160c depicted is provided for purposes of illustration, and that other arrangements of switchgear components may be used with bus structures according to embodiments of the invention subject matter.

Figure 4:
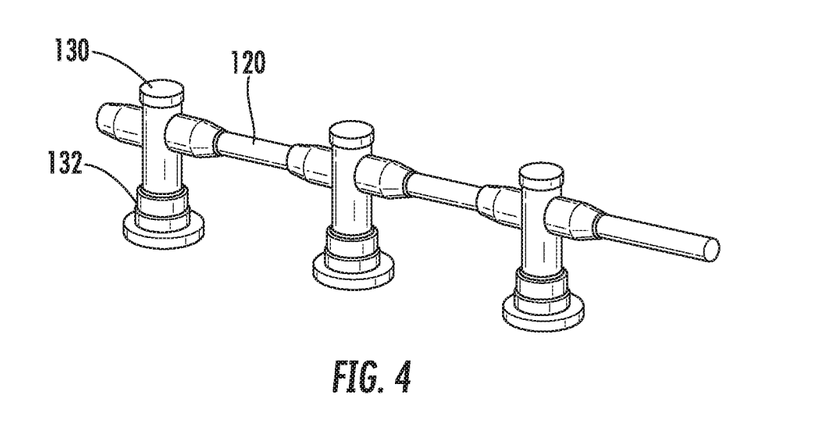
FIG. 4 is a perspective view of an insulated bus bar of the switchgear arrangement of FIG. 1.
Figure 5:
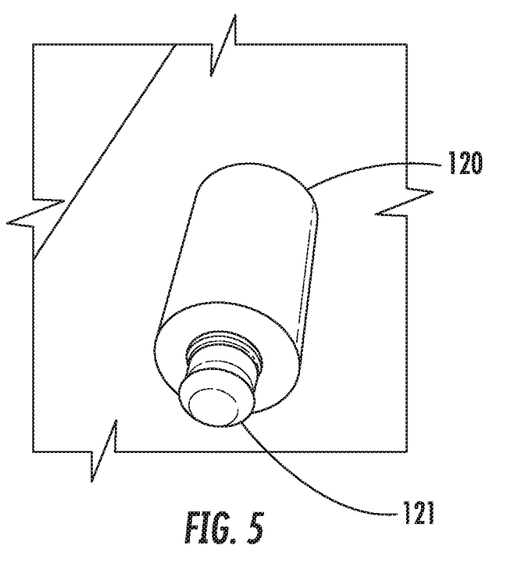
FIG. 5 is an end perspective view of the insulated bus bar of FIG. 4
Figure 6:
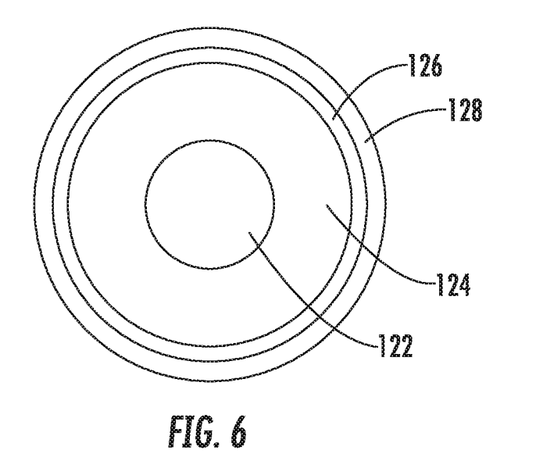
FIG. 6 is a cross-section of the insulated bus bar of FIG. 4.

FIG. 3 is a rear elevation illustrating that bus enclosures 110c of a row of panels 100 for a given phase (e.g., phase C) may abut one another to provide a continuous passage for containment of the bus sections 120c. In some embodiments, end ones of the bus enclosures 110c may have end caps or plates (not shown) that substantially seal the volume contained by the bus enclosures 110c and reduce or prevent penetration of moisture and contaminants. In some embodiments, louvers or other structures could be provided in the bus enclosures 110c and/or at end caps or plates to allow air flow through the channel defined by the bus enclosures 110c while limiting intrusion of moisture and contaminants. As shown in FIGS. 4-6, bus sections 120 may comprise solid shielded insulated system (SSIS) bus structures including a copper inner conductor 122, surrounded by an inner insulation layer 124, an outer earth ground shield conductor 126 and an outer insulation layer 128. The bus sections 120 may have end plugs 121 that are configured to mate with cross- or T-type connectors such as the connectors 130 described above.

Figure 7:
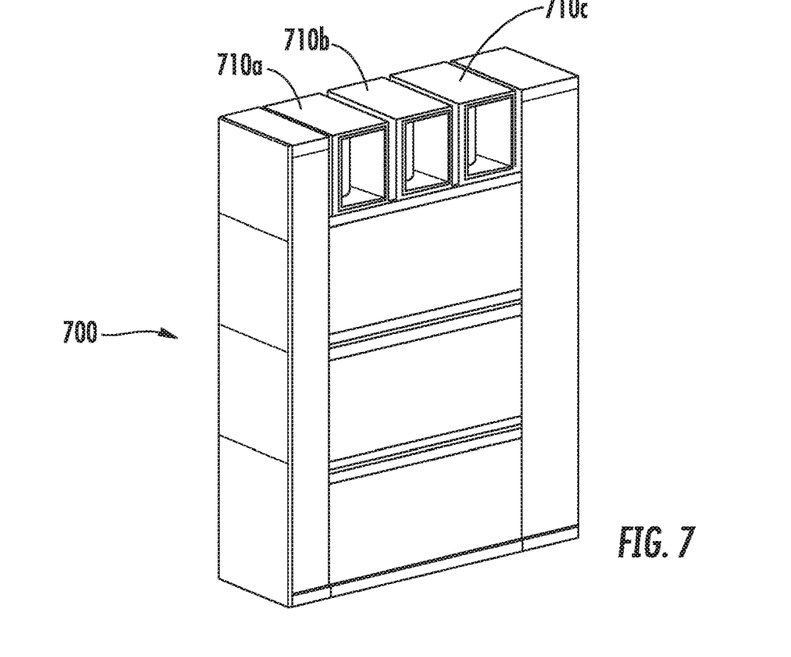
FIG. 7 is a perspective view of a switchgear arrangement according to further embodiments.
Figure 8:
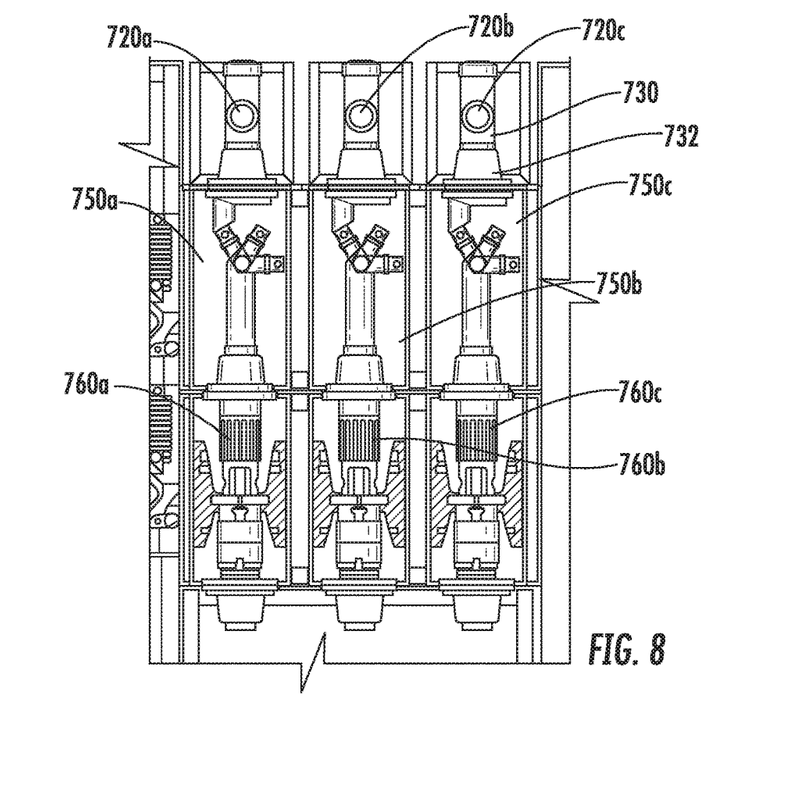
FIG. 8 is a side cross-section of the switchgear arrangement of FIG. 7
Figure 9:
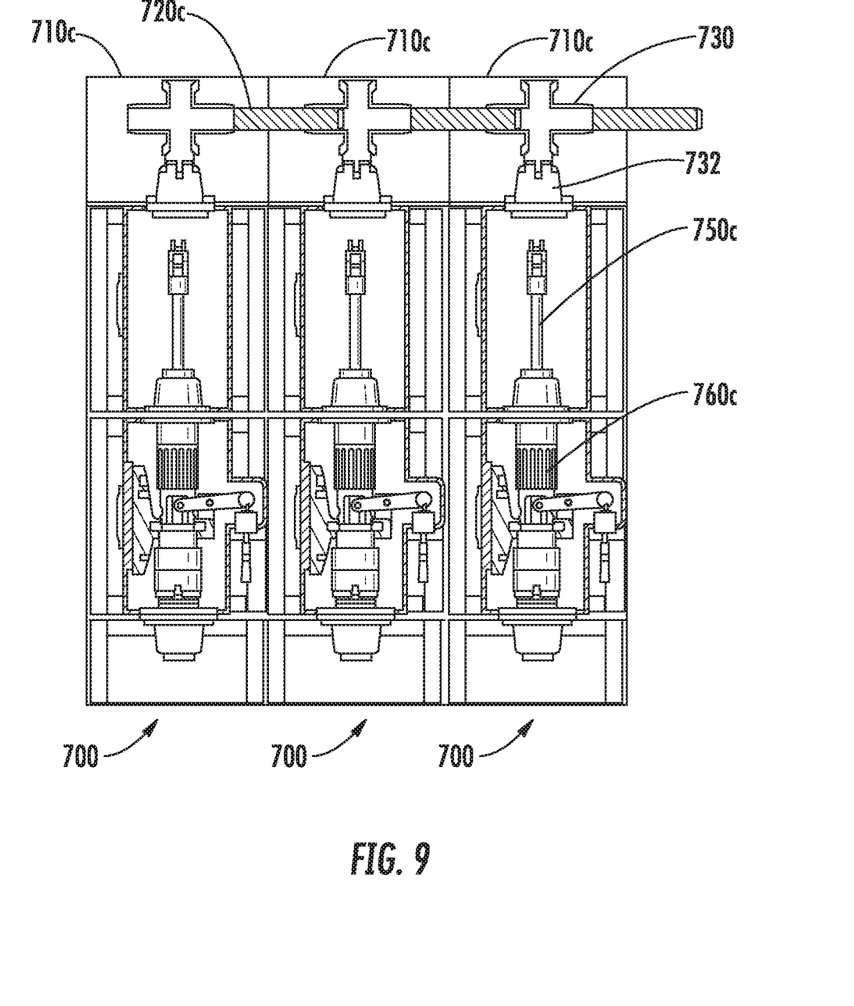
FIG. 9 is a rear cross-section of the switchgear arrangement of FIG. 7.

FIGS. 7-9 illustrate an alternative arrangement for a switchgear unit 700 using fabricated (sheet metal) bus enclosures 710a 710b, 710c that provide isolation between phase bus sections 720a, 720b, 720c. As shown in FIG. 8, the enclosures 710a, 710b, 710c may have grounded sheet metal walls that are separated from one another by air gaps. The bus sections 720a, 720b, 720c may be connected to gas-insulated disconnect switches 750a, 750b, 750c and gas-insulated circuit interrupters 760a, 760b, 760c via cross-type connectors 730 and bushing-type connectors 732.

FIG. 9 is a rear elevation illustrating that bus enclosures 710c of a row of panels 700 for a given phase may abut one another to provide a continuous passage for containment of the bus sections 720c. In some embodiments, end ones of the bus enclosures 710c may have end caps or plates (not shown) that substantially seal the volume contained by the enclosures 710c and reduce or prevent penetration of moisture and contaminants. In some embodiments, louvers or other structures could be provided in the bus enclosures 710c and/or at end plates attached thereto to allow air flow through the channel defined by the bus enclosures 710c while limiting intrusion of moisture and contaminants.

Figure 10:
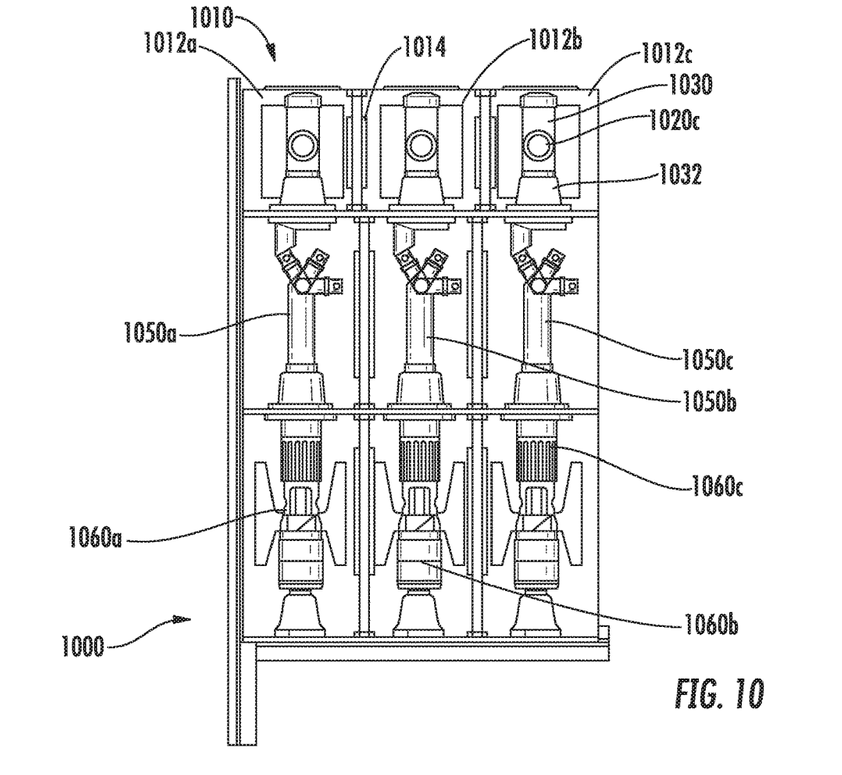
FIG. 10 is a side cross-section of a switchgear arrangement according to still further embodiments.
Figure 11:
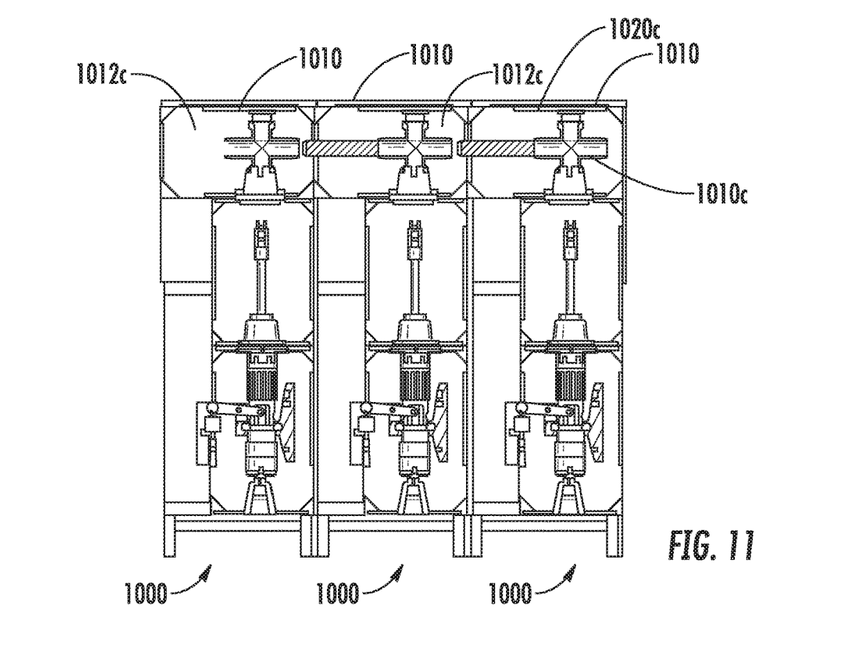
FIG. 11 is a rear cross-section of the switchgear arrangement of FIG. 10.

FIGS. 10 and 11 illustrate yet another arrangement in which a switchgear unit 1000 includes a multi-phase compartmented bus enclosure 1010 having a plurality of compartments 1012a, 1012b, 1012c therein. The compartments 1012a, 1012b, 1012c are separated by walls 1014, which may be grounded and/or insulating. Bus sections 1020a, 1020b, 1020c are contained within the compartments 1012a, 1012b, 1012c and interconnected by cross-type connectors 1030. The bus sections 1020a, 1020b, 1020c may be connected to gas-insulated disconnect switches 1050a, 1050b, 1050c by bushing-type connectors 1032. In the illustrated embodiments, the gas-insulated disconnect switches 1050a, 1050b, 1050c may be connected to respective gas-insulated circuit interrupters 1060a, 1060b, 1060c.

As shown in FIG. 11, bus enclosures 1010 for a row of switchgear units 1000 may abut one another to align the compartments 1012a, 1012b, 1012c on a phase basis to provide a continuous passage for containment of bus sections for a given phase. In some embodiments, end ones of the bus enclosures 1010 may have end caps or plates (not shown) that substantially seal the volume contained by the enclosures 1010 and reduce or prevent penetration of moisture and contaminants. In some embodiments, louvers or other structures could be provided in the bus enclosures 1010 and/or at end plates attached thereto to allow air flow through the channels defined by the bus enclosures 1010 while limiting intrusion of moisture and contaminants.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed is:

1. A switchgear assembly comprising:
    a plurality of gas insulated switches arranged in first and second parallel rows;
    a plurality of enclosures arranged in first and second rows extending parallel to respective ones of the first and second rows of switches and configured to provide respective continuous channels that support a flow of ambient air from outside of the enclosures, wherein each enclosure in the first row of enclosures is separated from an adjacent enclosure in the second row of enclosures by an air gap; and
    first and second bus assemblies providing respective first and second phases electrically isolated from one another, disposed in the respective continuous channels provided by respective ones of the first and second rows of enclosures and exposed to the ambient air within the respective first and second rows of enclosures, the first and second bus assemblies comprising respective first and second pluralities of interconnected bus sections having an insulating covering and electrically connected to respective ones of the first and second rows of gas insulated switches.

2. The switchgear assembly of claim 1, wherein walls of the enclosures of the first and second rows of enclosures are grounded or insulating.

3. The switchgear assembly of claim 1, wherein each of the first and second bus assemblies comprises interconnected bus sections, each comprising a solid shield insulated system comprising an inner conductor, an inner insulation layer surrounding the inner conductor, an outer shield conductor surrounding the inner insulation layer and the inner conductor, and an outer insulation layer surrounding the outer shield conductor, the inner insulation layer and the inner conductor.

4. The switchgear assembly of claim 1, wherein the first and second bus assemblies are electrically connected to the gas insulated switches via connectors positioned at external faces of gas-containment enclosures of the gas insulated switches.

5. The switchgear assembly of claim 1, wherein the first and second rows of enclosures comprise respective rows of tubular enclosures having a rectangular cross-section.

6. A switchgear assembly comprising
    a plurality of gas insulated switches in respective first and second rows;
    a bus containment structure comprising first and second rows of enclosures configured to provide respective continuous channels that support a flow of ambient air from outside of the enclosures and arranged in parallel such that each enclosure in the first row of enclosures is separated form an adjacent enclosure in the second row of enclosures by an air gap;
    a first bus assembly providing a first phase, disposed in the continuous channel provided by the first row of enclosures and exposed to the ambient air, the first bus assembly comprising interconnected bus sections having an insulating covering and electrically connected to the first row of gas insulated switches; and
    a second bus assembly providing a second phase electrically isolated from the first phase, disposed in the continuous channel provided by the second row of enclosures and exposed to the ambient air, the second bus assembly comprising interconnected bus sections having an insulating covering and electrically connected to the second row of gas insulated switches.

7. The switchgear assembly of claim 6, wherein the bus sections comprise an inner conductor, an inner insulation layer surrounding the inner conductor, an outer shield conductor surrounding the inner insulation layer and the inner conductor, and an outer insulation layer surrounding the outer shield conductor, the inner insulation layer and the inner conductor.

8. The switchgear assembly of claim 6, wherein the first row of enclosures is a first row of tubular enclosures and wherein the second row of enclosures is a second row of tubular enclosures.

9. The switchgear assembly of claim 8, wherein the tubular enclosures of the first row abut in an end-to-end manner and wherein the tubular enclosures of the second row abut in an end-to-end manner.

10. The switchgear assembly of claim 8, wherein walls of the tubular enclosures are grounded or insulating.

11. The switchgear assembly of claim 6, wherein the first and second rows of enclosures comprise respective rows of tubular enclosures having a rectangular cross-section.

* * * * *